Sept. 14, 1937.  I. SHORT ET AL  2,093,372
LIGHTING SET
Filed Aug. 26, 1936    4 Sheets-Sheet 3
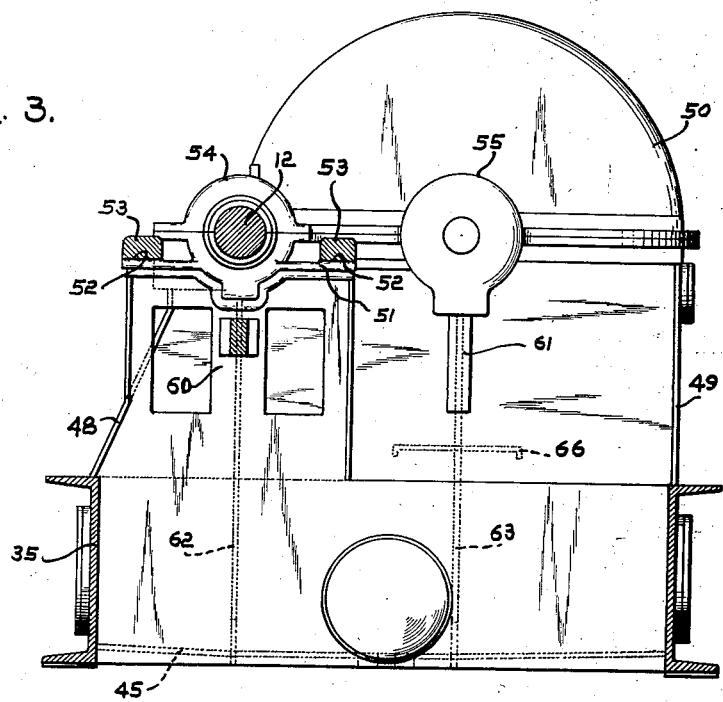
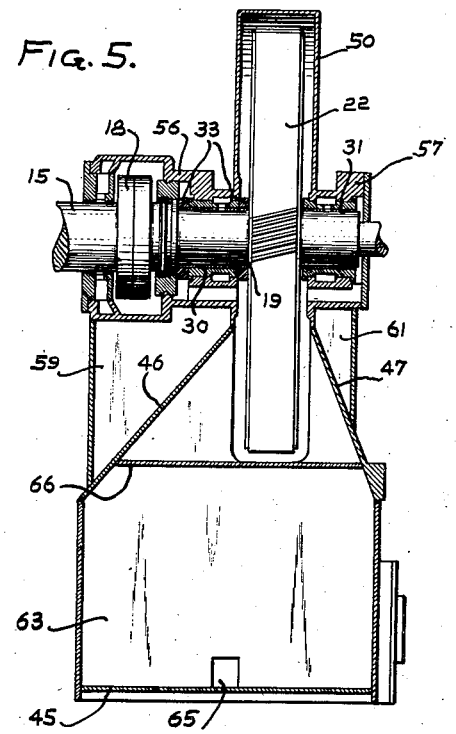
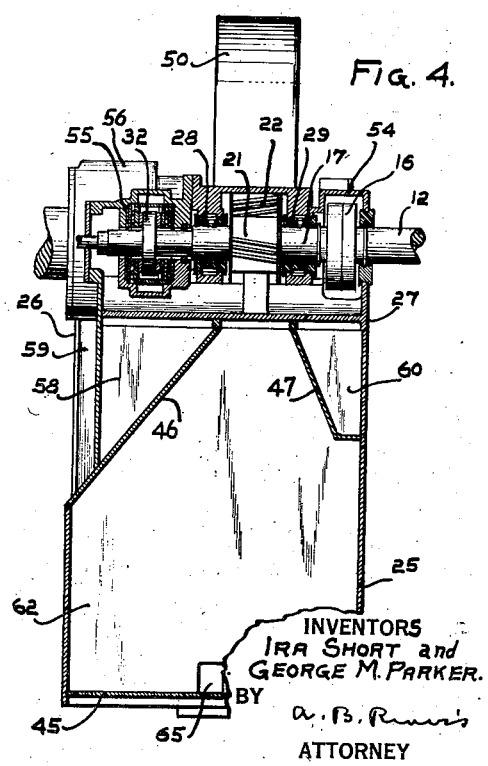
INVENTORS
IRA SHORT and
GEORGE M. PARKER.
BY
ATTORNEY INVENTORS
IRA SHORT and
GEORGE M. PARKER.
ATTORNEY Patented Sept. 14, 1937

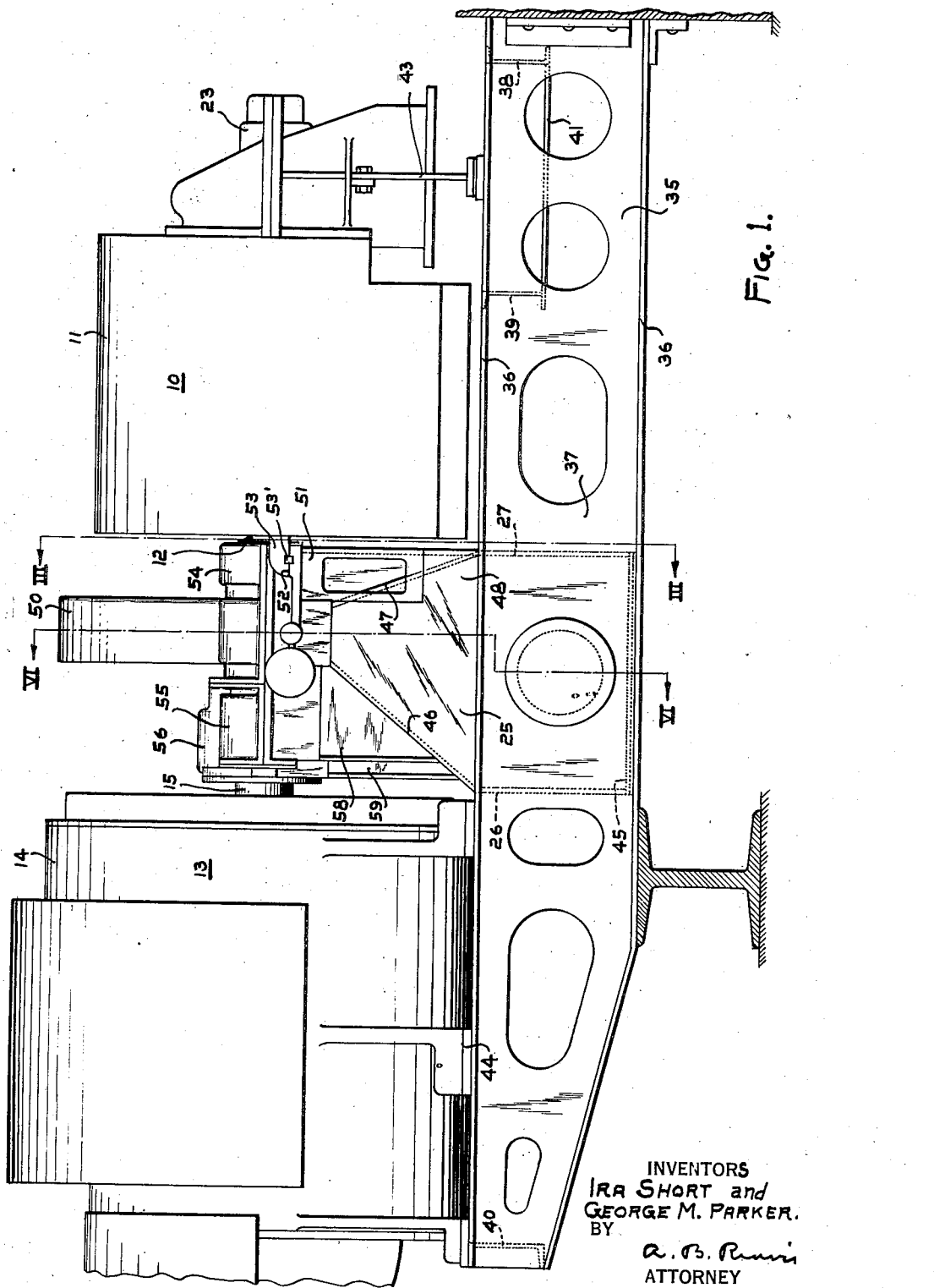

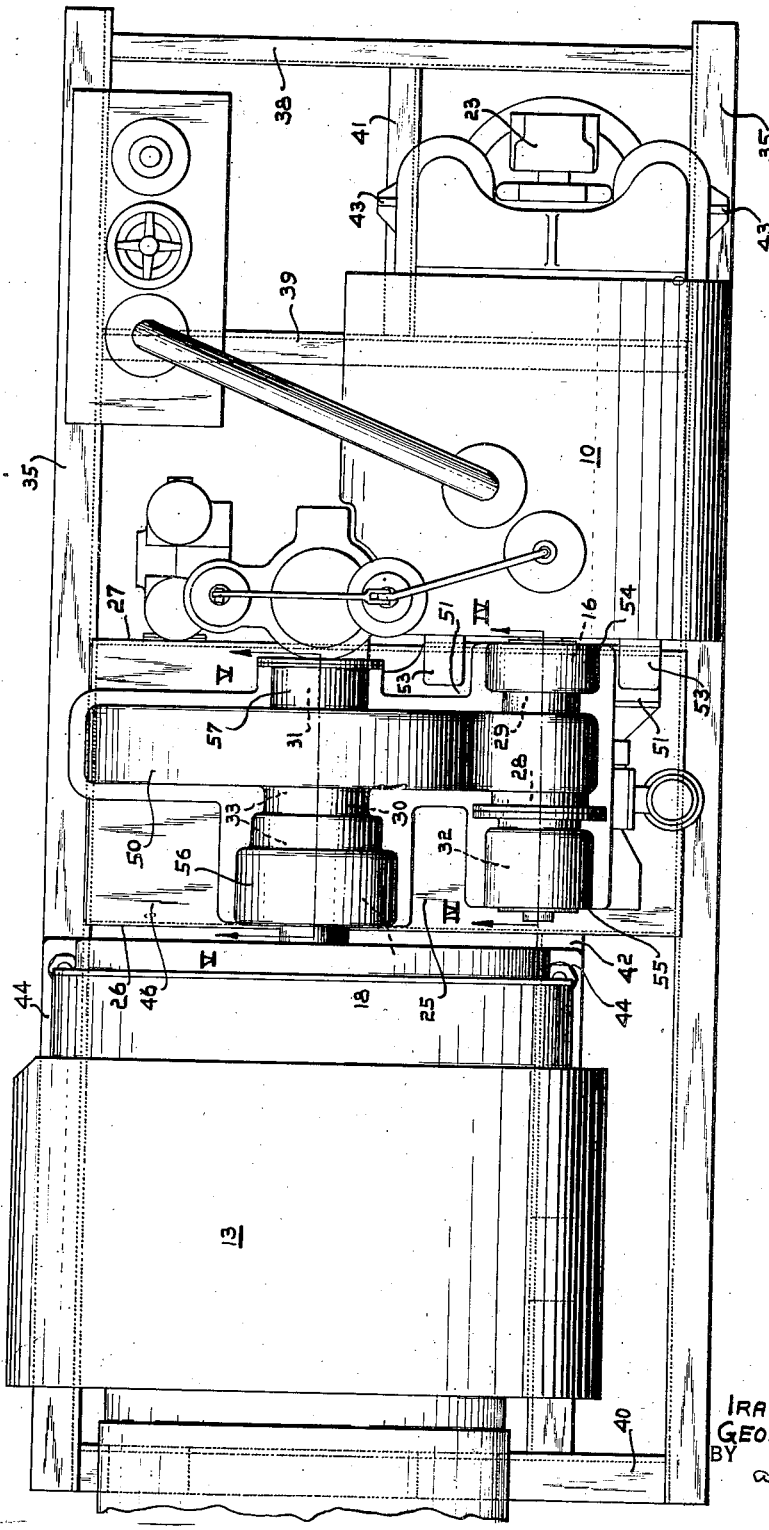

2,093,372

UNITED STATES PATENT OFFICE 2,093,372

LIGHTING SET

Ira Short, Prospect Park, and George M. Parker, Norwood, Pa., assignors to Westinghouse Electric & Manufacturing Company, East Pittsburgh, Pa., a corporation of Pennsylvania Application August 26, 1936, Serial No. 97,906

7 Claims. (Cl. 74—606)

Our invention relates to gearing for connecting the spindles of driving and driven machines and to supporting structure therefor, and it has for an object to provide supporting structure which includes a casing serving both to enclose the gearing and to strengthen and stiffen the structure.

It is common practice to construct small turbine-driven lighting plants in a unitary manner, a common bed-plate supporting the turbine, the generator, and the connecting reduction gearing. The present invention relates to this type of construction, but it incorporates certain novel features and arrangements contributing to strength and lightness of the structure, such features or arrangements mainly comprising a gear casing for the reduction gearing which constitutes a component part of the bedplate or supporting structure. The outer ends of the spindles of the turbine and of the generator are carried by bearings of the casing or stator structures thereof, while the inner and overlapping parallel end portions of the spindles are carried by the bearings of the reduction gear. Also, the outer end of the stator or casing structure of the turbine is supported from the bedplate structure and the inner end thereof, is directly connected to the gear casing, the horizontal plane of the connection being relatively close to the spindle axis to provide a direct connection from the turbine casing to the portion of the gear casing carrying a thrust bearing resisting both the gear action and thrust of the turbine, whereby the turbine casing and the gear casing constitute a unitary structure such that the thrust bearing is effective to resist thrust and to minimize displacement of the turbine spindle with respect to its stator with minimum deflection of the connecting structure. The gear casing is provided with two sets of alined bearings, each set comprising radial bearings connected to the side walls of the gear casing at opposite sides of the pinion and of the gear and a thrust bearing connected to one side wall of the gear casing, both thrust bearings being preferably connected to the side wall of the gear casing adjacent to the generator. Reinforcing plate structures extend underneath and are connected to the bearings of each set and extend transversely of and are connected to the gear casing including the side walls thereof, such reinforcing plate structures not only giving a strong stiff support for the bearings of each set, but strengthening the gear case so as to stiffen the bedplate as a whole. A further object of our invention is to provide apparatus of this character having the aforementioned improved type of gear case which encloses the gearing, gives substantial strength and stiffness to the bedplate, and supports radial and thrust bearings for the spindle ends.

These and other objects are effected by our invention as will be apparent from the following description and claims taken in connection with the accompanying drawings, forming a part of this application, in which:

Fig. 1 is a side elevational view of apparatus incorporating our improvements;

Fig. 2 is a plan view of the apparatus shown in Fig. 1;

Fig. 3 is a sectional view taken along the lines III—III of Fig. 1;

Fig. 4 is a sectional view taken along the line IV—IV of Fig. 2;

Fig. 5 is a sectional view taken along the line V—V of Fig. 2;

Figure 6:
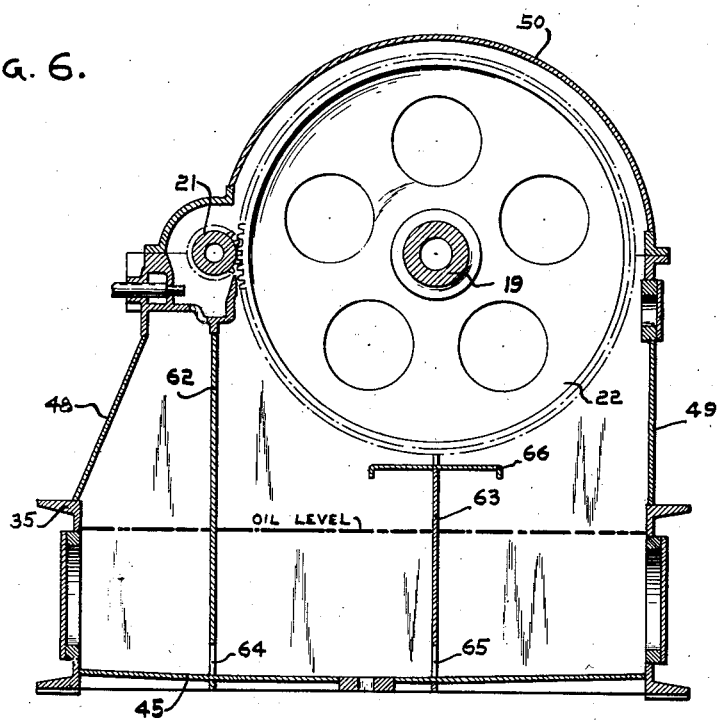
Fig. 6 is a transverse sectional view taken along the line VI—VI of Fig. 1; and, Fig. 7 is a view similar to Fig. 6 but showing a modified form of gear casing structure.

Referring now to the drawings more in detail, there is shown a turbine 10 embodying a casing or stator 11 and a spindle 12. A generator is shown at 13, the generator including a casing or stator 14 and a spindle 15. The spindles 12 and 15 are parallel and offset to accommodate the reduction gearing, the spindle 12 being connected by a rigid coupling 16 to the pinion spindle 17 and the spindle 15 being connected by a rigid coupling 18 to the gear spindle 19, whereby the pinion and gear spindles 17 and 19 are, in effect, rigid and integral extensions of the turbine and generator spindles. The pinion spindle 17 has a single helix pinion 21 meshing with a single helix gear 22 on the gear spindle.

The outer ends of the turbine and generator spindles 12 and 15 are carried by the usual bearings at the outer ends of the stators 11 and 14, respectively, the turbine outer stator bearing being shown at 23. The inner ends of the spindles are not supported by the casings or stators 11 and 14 but by the gear casing 25, the gear casing having side walls 26 and 27 carrying radial bearings 28 and 29 for the pinion 21 and radial bearings 30 and 31 for the gear 22. The gear casing also carries a thrust bearing 32 for the pinion spindle 17 and thrust bearing elements 33 for the gear spindle 19, the thrust bearings preferably being connected to the casing side wall 26 adjacent to the generator.

The pinion 21 and the gear 22 are shown as being of the single helix type, the thrust bearings 32 and 33 not only resisting the gear action but also the thrust of the generator and of the turbine. An important field of use for the present arrangement is on board ship. Hence, because of this particular use, not only are mechanical thrusts developed, but there is the steam thrust of the turbine and maintenance of the stator and rotor of the latter in correct relative axial position which have to be taken into account. As single helix gearing is capable of providing relative axial displacement of the pinion and of the gear, good gear action under all conditions of operation is assured irrespective of the directions of thrust and of the small amount of displacement inherent in thrust bearings. In other words, by the arrangement of single helix gearing and the thrust bearings, the pinion and the gear elements may, in effect, be integral parts of the rotors without thrusts of the turbine and the generator disturbing good gear action. On the other hand, if double helix or herringbone gearing were employed with the bearing and supporting arrangement described, it would be impossible to keep the load divided between the helices for the reason that there is a necessary operating tolerance or clearance in the thrust bearings, with the result that, with different thrust conditions in the arrangement, one helix might not only carry all the load but be severely overloaded, this result following because of the inherent inability of double helix gearing to afford the small amount of relative axial displacement such as may occur with single helix gearing. Accordingly, therefore, not only does the casing 25 enclose the gearing and support the bearings thereof, such bearings also constituting bearings of the turbine and generator spindles, but, by the use of single helix gearing within the casing, the pinion and gear elements may in effect constitute integral parts of the turbine and gear spindle, the single helix gearing providing for relative axial displacement so as to accommodate thrusts in opposite directions.

Referring now to the supporting structure for the turbine, generator, and reduction gearing, this includes side beams 35, preferably of channel form, and having upper and lower flanges 36 connected by a web portion 37. The side beams 35 are joined preferably by welding, by a plurality of cross members 38, 39, and 40, as well as by the gear casing 25, which serves as a cross member. As the turbine 10 and the generator 13 are laterally offet to accommodate the reduction gearing, supplementary supporting elements are required. Accordingly, longitudinal beams or stringers 41 and 42 extend between the cross members 38 and 39 and between the gear casing 25 and the cross member 40.

The outer end of the turbine casing or stator 11 is supported by flexible struts 43 whose lower ends are connected to one of the side beams 35 and to the supplementary beam or stringer 41, the purpose of this arrangement being to allow for expansion and contraction of the turbine stator. The generator has feet 44 connected to the other side beam 35 and to the longitudinal stringer or beam 42.

The gear casing 25 not only encloses the gearing and supports the adjacent spindle ends of the turbine and of the generator but also carries the adjacent end of the turbine cylinder or stator, and such casing constitutes a strong and stiff reinforcement for the bedplate structure as a whole. The gear casing includes said side walls 26 and 27 as well as a bottom wall 45 whose ends are joined, preferably by welding, to the web portions 37 of the side beams 35, whereby the web portions comprise wall elements of the gear casing enclosure. The side plates 26 and 27 are provided with upper portions 46 and 47 which converge upwardly, the side wall 46 carrying the radial bearings 28 and 30 and the thrust bearings 32 and 33 and the wall 47 carrying the radial bearings 29 and 31. The ends of the side plates 46 and 47 of the gear case above the beams 35 are joined by end plates 48 and 49. As shown, the gear case is divided horizontally in the plane of the axes of the pinion and of the gear and is provided with a cover 50.

Aside from the gear casing serving to support and enclose the gearing and to stiffen and strengthen the bedplate structure, it is an important supporting element for parts of the turbine as well as of the generator. As already pointed out, the turbine and generator casings each have a single outer bearing for supporting the outer ends of their respective spindles and the inner overlapping ends of the spindles are supported by the sets of bearings carried by the gear casing. In addition, the gear casing serves to support the inner end of the turbine casing, the adjacent side of the gear casing being provided with fabricated brackets 51 having upper supporting surfaces 52 upon which rest the feet 53 carried by the turbine casing, the feet being connected to the brackets by any suitable means, such as transverse keys 53', which permit of radial expansion and contraction of the turbine casing but at the same time provide for the transmission of stresses longitudinally from the gear casing to the turbine casing. As the supporting surfaces 52 and the feet 53 are located relatively close to the plane of the turbine axis, stresses are transmitted from the turbine spindle through the thrust bearing and the gear casing to the turbine casing in a direct manner with negligible bending moments and deflection of the structure, whereby the proper relation of the turbine rotor and stator may be preserved with a strong and light construction.

Since the side walls 46 and 47 of the gear casing converge conformably to the provision of a slot suitable for the horizontal cross section of the pinion and of the gear, it is necessary to provide outwardly-extending structures for holding the bearings, the casing has structures 54 and 55 for the set of pinion bearings 28, 32 and 29 and structures 56 and 57 for the set of gear bearings 33, 30, and 31, the outwardly-extending structures 55 to 57, inclusive, being made in upper and lower halves with the upper half carried by the cover 50. The lower halves of the bearing holding structures 55 and 56 are reenforced by means of plate structures 58 and 59 connected underneath thereof and joined to the gear casing. In like manner, the bearing holding structures 54 and 57 are reinforced by means of plate structures 60 and 61 extending underneath and connected thereto as well as to the gear casing. As shown in Fig. 6, the gear casing has its interior divided by the partitions 62 and 63 arranged in the vertical planes of the pinion and gear axes.

The partition 62 is in substantial registry with the gusset supporting plates 58 and 60. In like manner, the partition 63 alines with the plates 59 and 61. Thus, it will be seen that the sets of bearings are supported underneath by plate structures extending longitudinally thereof and connected thereto in the vertical planes of the pinion and gear axes, the plate structures being connected to the gear casing in such manner that, with the gear casing, they provide a strong and stiff support for the sets of bearings. In addition, the reinforcing plate structures for supporting the sets of bearings stiffen the gear casing so that the latter adds to the strength and stiffness of the bedplate structure.

The plates 62 and 63 necessarily divide the lubricant reservoir portion of the gear casing into a plurality of compartments; and, in order that all of such compartments may be in circuit with the lubricating system, the partitions have openings 64 and 65 providing for inter-communication at the bottom among the compartments so that lubricant may leave through a common discharge.

The top portions of the plates 62 and 63 are relieved sufficiently to accommodate the pinion and gear elements. Also, the plate 63 carries a baffle 66 arranged below the gear 22 and it operates to prevent submergence of a portion of the gear with listing of the ship.

Figure 7:
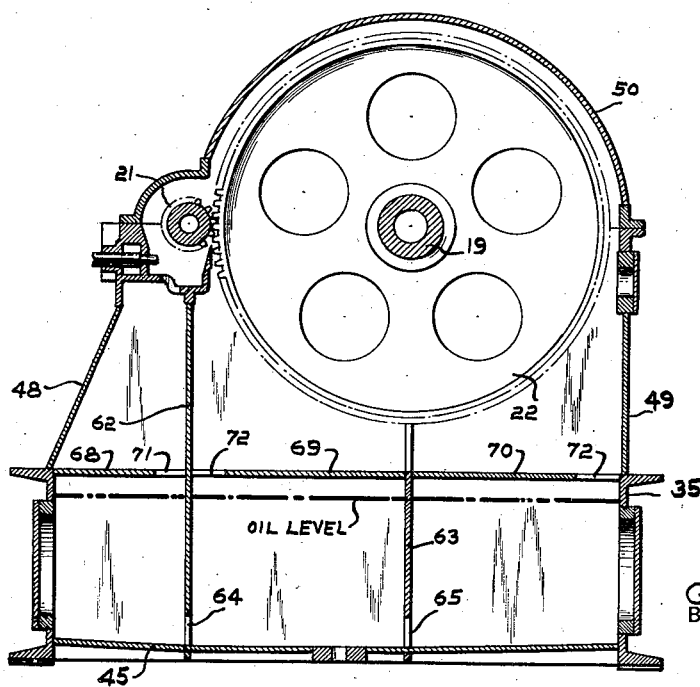

In Fig. 7, we show a modified form wherein the gear casing includes horizontal plates 68, 69, and 70 joined to the upper edges of the side beams 35, to the side plates 26 and 27 and to the partitions 62 and 63, and serving principally as reinforcements to add to the strength and stiffness of the gear casing so that the latter functions better as a supporting structure and as a stiffening member for the bed construction. The plates have openings 71 and 72 therein providing for passage of lubricant into the lower reservoir portion. The openings 72 are disposed adjacent to the end wall 49 of the gear casing and to the partition 62 with the result that the horizontal plates 69 and 70 operate to prevent undue submergence or splashing of oil onto the gear with listing of the ship.

While we have shown our invention in several forms, it will be obvious to those skilled in the art that it is not so limited, but is susceptible of various other changes and modifications without departing from the spirit thereof, and we desire, therefore, that only such limitations shall be placed thereupon as are imposed by the prior art or as are specifically set forth in the appended claims.

What we claim is:

1. The combination with driving and driven machines connected by reduction gearing, of a fabricated bed structure for the machines and the gearing and comprising side beams having web portions and cross members joining the side beams and including a casing for the gearing, said casing including side and bottom plates having their ends joined to the beam webs so that the latter constitute wall elements of the casing.

2. The combination with driving and driven machines connected by reduction gearing including a meshing pinion and gear, of a fabricated bed structure for the machines and the gearing and comprising side beams having web portions and cross members joining the side beams and including a casing for the gearing, said casing including a lower lubricant reservoir and an upper gear enclosure, said lubricant reservoir being defined by bottom and side plates joined to the web portions of the beams so that the latter constitute wall elements of the reservoir and the upper enclosure including converging side walls joined to the reservoir side walls, pinion and gear bearings carried by the casing, and reinforcing structures for the bearings arranged therebelow and including plate elements extending transversely of the casing.

3. The combination with driving and driven machines connected by reduction gearing including a meshing pinion and gear, of a fabricated bed structure for the machines and the gearing and comprising side beams having web portions and cross members joining the side beams and including a casing for the gearing, said casing including side and bottom plates having their ends joined to the beam web portions so that the latter constitute wall elements of the casing and including end plates joining the side plates above the beams, pinion and gear bearings carried by the casing, and reenforcements for the bearings including plate elements disposed vertically below and connected to the bearings and extending transversely of the casing and connected to the latter.

4. The combination with driving and driven machines, each machine having a spindle and a casing and the spindle having parallel and off-set adjacent end portions of gear elements for connecting the adjacent end portions of the spindles and including a pinion carried by the driving spindle and meshing with a gear carried by the driven spindle; bearings for the spindles including bearings carried by the casings for the outermost ends of the spindles and sets of bearings for the adjacent over-lapping ends of the spindles, each set of bearings including a radial bearing for each spindle at either side of its gear element; and supporting structure for the machines and the sets of bearings, said structure including side beams connected by cross members including a casing for the gearing, said casing including side and bottom plates having their ends joined to the beam webs so that the latter provide wall elements of the casing enclosure and the side plates of the casing carrying said sets of bearings, and reinforcing plate structures extending vertically underneath the bearings of each set and transversely of the casing and connected to the bearings and the casing.

5. The combination with driving and driven machines, each machine having a spindle and a casing and the spindles having parallel and off-set adjacent end portions, of gearing for connecting the adjacent end portions of the spindles and including a single helix pinion carried by the driving spindle and meshing with a single helix gear carried by the driven spindle; bearings for the spindles including bearings carried by the casings for the outermost ends of the spindles and sets of bearings for the adjacent over-lapping ends of the spindles, each set of bearings including a radial bearing for each spindle at either side of its gear element and a thrust bearing; supporting structure for the machines and the sets of bearings, said structure including side beams connected by cross members including a casing for the gearing, said casing including side and bottom plates having their ends joined to the beam webs so that the latter provide wall elements of the casing enclosure and the side plates of the casing carrying said sets of bearings, and reinforcing plate structures extending vertically underneath the bearings of each set and transversely of the casing and connected to the bearings and the casing; and means providing a horizontal connection between the casing of the driving machine and the gear casing and located relatively near to the driving spindle axis so that thrusts of the driving spindle may be transmitted in substantially direct manner to the driving machine casing so as to minimize deflection of the connecting structure and relative displacement of the driving machine casing and spindle incident thereto.

6. The combination with driving and driven machines, each machine having a spindle and a casing and the spindles having parallel and off-set adjacent end portions, of gear elements for connecting the adjacent end portions of the spindles, said gear elements including a single helix pinion carried by the driving spindle and meshing with a single helix gear carried by the driven spindle; supporting structure for said machines and the gear elements; said supporting structure comprising side beams, cross members joining the side beams and including a casing for the gear elements, said casing including bottom and side plates joined to the beam webs so that the latter provide wall elements for the casing enclosure, a set of bearings for each spindle carried by the casing above the side beams, each set of bearings including one radial bearing connected to one side wall of the casing and axially-aligned radial and thrust bearings connected to the other side wall of the casing, and reinforcing plate structures joined underneath to the bearings of each set and extending transversely and joined to the walls of the casing including the side walls thereof.

7. The combination with driving and driven machines, each machine having a spindle and a casing and the spindles being arranged in parallel offset relation, of driving and driven gear spindles connected to the adjacent ends of the spindles of the driving and driven machines, respectively, gear elements for connecting the driving and driven gear spindles and including a pinion carried by the driven gear spindle; bearings for the spindles including bearings carried by the casings for the outermost ends of the driving and driven machine spindles and sets of bearings for the parallel and overlapping driving and driven gear spindles, each set of bearings including a radial bearing for each gear spindle and disposed at either side of its gear element; supporting structure for the machines and the sets of bearings, said structure including side beams connected by cross members including a casing for the gearing, said casing including side and bottom plates having their ends joined to the beam webs so that the latter provide wall elements of the casing enclosure and the portions of the side plates of the casing extending above the side beams carrying said sets of bearings, and reinforcing plate structures extending vertically underneath the bearings of each set and transversely of the casing and connected to the bearings and to the casing including the side and bottom plates thereof; the lower portion of said gear casing comprised by the webs of the side beams, the lower portions of the side plates and the bottom plate constituting a lubricant collection chamber; and plate means extending laterally from the reinforcing plate structure beneath the driven gear to minimize lubricant in the reservoir coming in contact with the lower portion of the gear upon listing movements being given to the supporting structure.

IRA SHORT.
GEORGE M. PARKER.